Aug. 2, 1960

M. LIESSE 2,947,019

DEVICE FOR REGULATING THE PRESSURE
OR INSURING A CONSTANT PRESSURE
ON WINDSHIELD WIPER BLADES

Filed July 21, 1958

INVENTOR
Maurice Liesse
By Holcomb, Wetherill & Brisbois
ATTORNEYS

United States Patent Office 2,947,019
Patented Aug. 2, 1960

2,947,019
DEVICE FOR REGULATING THE PRESSURE OR INSURING A CONSTANT PRESSURE ON WINDSHIELD WIPER BLADES

Maurice Liesse, 67 Ave. Paul Vaillant, Couturier, Cachan (Seine), France

Filed July 21, 1958, Ser. No. 749,973

3 Claims. (Cl. 15—250.2)

The present invention has for its object to provide a device for varying in a windshield wiper the leverage of the spring or springs by moving the acting point thereof as an inverse function of the tension thereof.

According to the present invention there can be obtained a constant force or any desired changes in force irrespective of the position of the hinged wiper arms, by causing an end of a spring to wind up on a cam the profile of which is a function of the slope thereof.

It can then be seen that with such a device there can be obtained different leverages for each winding-up position on said cam, and consequently either a constant force applied at the end of the hinged levers by utilizing a leverage inversely proportional to the spring tension, or a desired combination of different forces at different positions.

Figure 1:
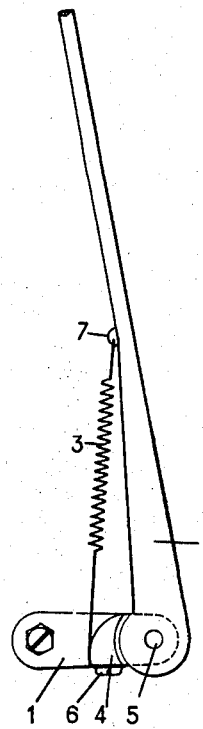
Figure 2:
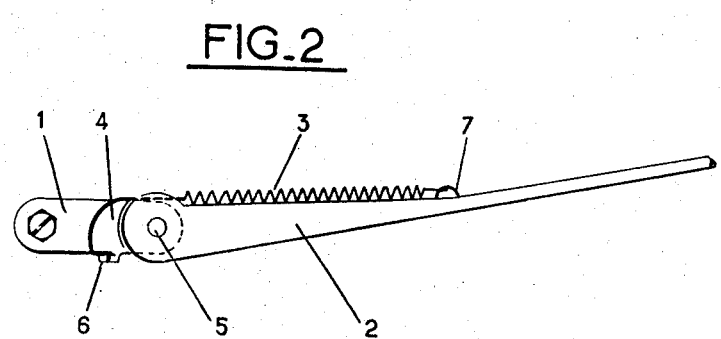

The present invention will be best understood through the following description which is given to illustrate the same without any limitation of the scope thereof, said description being made to explain how the above-mentioned device may be carried out in practice with the aid of the accompanying drawings, in which:

Fig. 1 shows the device as a whole in an extreme position with the spring under a low tension; and Fig. 2 shows the device as a whole in an extreme position with the spring under a maximum tension.

According to the present invention the device shown in Figs. 1 and 2 comprises essentially a spring 3 which is wound by an end around a cam 4 integral with a hub 1. The blade carrier arm 2 is hinged on said hub 1 by a shaft 5 and maintains the other end of the spring 3 by means of a hook 7. A screw 6 maintains the end of the spring in a fixed position behind the cam 4.

When the blade carrier arm is in the position as shown in Fig. 1, the spring is released and the extremity thereof lies on the lob of cam 4 at a maximum distance from the hinged shaft 5, and the weaker force applied by the spring 3 resulting from the low tension thereof is compensated by an important leverage, In Fig. 2 the spring 3 is shown in an extended position but its extremity has been wound up on the cam 4 and is now closer to the shaft 5, and the low leverage compensates the tension of the spring 3.

It is to be understood that the present invention is not limited to the examplary form described hereinabove and shown in the drawings and that many changes may occur to those skilled in the art without departing from the scope of the invention as defined in the appended claims.

What I claim is:

1. A mounting for a windshield wiper arm and blade assembly comprising a hub, pivot means on said hub, said wiper arm being mounted on said pivot means for pivotal movement toward and away from said windshield, a spring connected to said hub and to said wiper arm at points spaced from said pivot means to bias said blade against said windshield, and a cam fixed to said hub, said spring being connected to bend about said cam as said wiper arm turns about said pivot means, said cam being contoured to vary the distance between said spring and pivot means and thereby regulate the pressure of said blade against said windshield as said arm turns about said pivot means.

2. A mounting for a windshield wiper arm and blade assembly as claimed in claim 1 in which said cam is contoured to reduce said distance in proportion to the increase in tension of said spring resulting from the movement of said wiper arm in a direction extending said spring, so that the effective torque on said arm resulting from the tension of said spring multiplied by said distance remains constant.

3. A mounting for a windshield wiper arm and blade assembly as claimed in claim 1 in which said cam is contoured so that the product of the distance between said spring and pivot means multiplied by the tension of said spring when said wiper arm is in certain positions relative to said hub differs from said product when said lever arm is in other positions, said lever arm positions being determined by the contour of said windshield as said wiper blade passes thereover.

References Cited in the file of this patent

UNITED STATES PATENTS

| | | |
|---|---|---|
| 1,816,164 | Wood | July 28, 1931 |
| 2,178,122 | Ostler et al. | Oct. 31, 1939 |
| 2,844,838 | Krohm | July 29, 1958 |